United States Patent
Vishwanath et al.

(10) Patent No.: US 12,287,730 B1
(45) Date of Patent: Apr. 29, 2025

(54) DEVICES AND METHODS FOR IMPROVING MULTI-STREAM WRITE AMPLIFICATION FACTOR

(71) Applicant: SK Hynix NAND Product Solutions Corp., Rancho Cordova, CA (US)

(72) Inventors: Darshan Mallapur Vishwanath, Santa Clara, CA (US); David Carlton, Pleasanton, CA (US); Jonathan Hughes, Longmont, CO (US)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 0 days.

(21) Appl. No.: 18/394,104

(22) Filed: Dec. 22, 2023

(51) Int. Cl.
*G06F 12/02* (2006.01)

(52) U.S. Cl.
CPC .. *G06F 12/0246* (2013.01); *G06F 2212/7205* (2013.01)

(58) Field of Classification Search
None
See application file for complete search history.

(56) References Cited

U.S. PATENT DOCUMENTS

| | | | |
|---|---|---|---|
| 9,430,376 B2 | 8/2016 | Horn | |
| 10,126,958 B2 | 11/2018 | Ramalingam | |
| 10,592,412 B2 | 3/2020 | Ke | |
| 2002/0087822 A1* | 7/2002 | Butterworth | G06F 3/0689 711/170 |
| 2009/0248660 A1* | 10/2009 | Ghosh | G06Q 30/08 707/999.005 |
| 2015/0067239 A1 | 3/2015 | Chu et al. | |
| 2018/0349053 A1* | 12/2018 | Battaje | G06F 12/0891 |
| 2021/0397551 A1 | 12/2021 | Printezis et al. | |
| 2024/0070475 A1* | 2/2024 | Huang | G06N 20/20 |

* cited by examiner

*Primary Examiner* — Stephanie Wu
(74) *Attorney, Agent, or Firm* — HALEY GUILIANO LLP (57) ABSTRACT

A device and related method, the device including memory and processing circuitry. The memory includes sets of source memory bands and a defragmentation destination memory band. Each set of source memory bands includes source memory bands and at least one portion of each source memory band stores valid data. The processing circuitry determines a merit score corresponding to each source memory band based on one or more characteristics of portions of data of each corresponding source memory band and determines, for each set of source memory bands, a respective source memory band that corresponds to a second-highest merit score. The processing circuitry identifies a set of source memory bands that includes a source memory band corresponding to a highest second-highest merit score and stores at least one portion of valid data from the source memory bands of the identified set of source memory bands to the defragmentation destination memory band.

20 Claims, 5 Drawing Sheets

DEVICES AND METHODS FOR IMPROVING MULTI-STREAM WRITE AMPLIFICATION FACTOR

TECHNICAL FIELD

The present disclosure is directed to devices and methods for performing defragmentation or garbage collection.

SUMMARY

In accordance with the present disclosure, devices and methods are provided for performing defragmentation on multiple sets of source memory bands of a device. The device includes memory, which may include memory blocks with pages or super pages of memory. The memory may be organized in sets of source memory bands, each set of source memory bands including at least one source memory band. Each source memory band is configured to store data (e.g., host data) associated with a respective host or write stream. The device and method disclosed herein may employ the use of a merit score function to determine a merit score for each respective source memory band based on at least one of (a) an amount of valid data in the respective source memory band and (b) the age of data in the respective source memory band. The merit score function allows for the processing circuitry of the device to prioritize the defragmentation of source memory bands with high merit scores. In some embodiments, the merit score of a respective source memory band increases as the amount of valid data in the respective source memory band decreases. In some embodiments, the merit score of a respective source memory band increases as the age of the data in the respective source memory band increases. Generally, the merit score of a source memory band increases as the respective source memory band becomes more favorable to be chosen, by processing circuitry, for garbage collection/defragmentation.

Typically for a device such as a storage device (e.g., solid-state drive device), the processing circuitry of the device periodically consolidates areas of the memory that partially store valid data. This garbage collection or defragmentation process ensures that the processing circuitry provides available memory resources for new, incoming data (e.g., new host data). In some embodiments, the processing circuitry performs the defragmentation of valid data or garbage collection of invalid data as a background procedure as the processing circuitry executes instructions. Therefore, the background activity of the garbage collection and defragmentation processes consumes processing resources, which impacts the overall performance and endurance of the device. The processing circuitry may use the merit score function in order to identify a source memory band on which to perform defragmentation or garbage collection. However, in some examples, there is an issue of recency bias such that a partially garbage-collected source memory band with newly lowered amounts of valid data is prioritized for further garbage collection although it may not be the best choice for optimally allocating the processing resources of the device for defragmentation/garbage collection. The device and methods disclosed herein reduce the impact on performance due to the recency bias when using merit score functions by identifying a set of source memory bands among multiple sets of source memory bands for garbage collection based on the second-highest merit score of the source memory bands for each set of source memory bands.

The device may include processing circuitry, which is configured to determine a respective merit score corresponding to each source memory band of each set of source memory bands based on at least one characteristic of at least one respective portion of data of each corresponding source memory band. The processing circuitry is also configured to determine a respective source memory band that corresponds to a second-highest merit score for each set of source memory bands. Once a respective source memory band that corresponds to the second-highest merit score for each set of source memory bands is determined, the processing circuitry identifies a set of source memory bands from the multiple sets of source memory bands that includes a source memory band corresponding to a highest second-highest merit score. Lastly, the processing circuitry stores at least one portion of valid data from at least one source memory band of the identified set of source memory bands to a defragmentation destination memory band. This device and the methods provided herein improve the overall performance and endurance of the processing circuitry of the device (e.g., a solid-state drive (SSD) device).

In some embodiments, the device (e.g., a storage device) is provided with a memory and processing circuitry that are communicatively coupled to each other. In some embodiments, the processing circuitry receives write requests which includes data stored within a respective source memory band of a set of source memory bands. In some embodiments, portions of the data stored in the source memory band may become invalid, which is one characteristic of the data stored in the source memory band that may be used by the processing circuitry to determine a respective merit score of the source memory band.

BRIEF DESCRIPTION OF THE DRAWINGS

The following description includes discussion of figures having illustrations given by way of example of implementations of embodiments of the disclosure. The drawings should be understood by way of example, and not by way of limitation. As used herein, references to one or more "embodiments" are to be understood as describing a particular feature, structure, and/or characteristic included in at least one implementation. Thus, phrases such as "in one embodiment" or "in an alternate embodiment" appearing herein describe various embodiments and implementations and do not necessarily all refer to the same embodiment. However, they are also not necessarily mutually exclusive.

DETAILED DESCRIPTION

In accordance with the present disclosure, devices and methods are provided for performing defragmentation/garbage collection on multiple sets of source memory bands of the device (e.g., an SSD device) using a merit score function while reducing recency bias when determining a source memory band to be garbage collected. The device (e.g., an SSD device) may include multiple memory dies (e.g., NAND memory dies), and the device is configured to perform garbage collection/defragmentation on multiple sets of source memory bands which stores host data from multiple hosts. Typically for a device such as a storage device (e.g., solid-state drive device), the processing circuitry of the device periodically consolidates areas of the memory that partially store valid data. This garbage collection or defragmentation process ensures that the processing circuitry provides available memory resources for new, incoming data (e.g., new host data). In some embodiments, the processing circuitry performs the defragmentation of valid data or garbage collection of invalid data as a background procedure as the processing circuitry executes instructions. Therefore, the background activity of the garbage collection and defragmentation processes consumes processing resources, which impacts the overall performance and endurance of the device. One metric to measure this impact on the performance and endurance is the write amplification factor, defined as the ratio of total writes to host writes. A lower write amplification factor indicates fewer total writes relative to the number of host writes received and performed by the processing circuitry, and therefore a more efficient performing device. In some examples of a system with a device communicatively coupled to a host, the host may include multiple virtual machines or applications that are unaware that the other virtual machines or applications may access the memory of the device.

The features of the disclosure described herein are in the context of a device (e.g., an SSD device) having processing circuitry and memory. However, the principles of the present disclosure may be applied to any other suitable context in which defragmentation of multiple sets of source memory bands of a device is performed. The device may include memory and processing circuitry, and the processing circuitry and memory are communicatively coupled to each other by a network bus or interface. In some embodiments, the processing circuitry determines merit scores, each merit score corresponding to a source memory band for each set of source memory bands, and determines a respective source memory band that corresponds to a second-highest merit score for each set of source memory bands. The processing circuitry then identifies a set of source memory bands that includes a source memory band corresponding to the highest second-highest merit score and scores at least one portion of valid data from at least one source memory band of the identified set of source memory bands to a defragmentation destination memory band. In some embodiments, requests are sent from a host to the device via a network bus or interface.

In particular, the present disclosure provides devices and methods that perform defragmentation on multiple sets of source memory bands on the device in order to improve the overall performance and endurance of the processing circuitry of the device.

In some embodiments, a processor of the processing circuitry may be a highly parallelized processor capable of handling high bandwidths of incoming data quickly (e.g., by starting simultaneous processing of write requests or instructions before completion of previously received write requests or instructions).

In some embodiments, the memory of the device disclosed herein may contain any of the following memory densities: single-level cells (SLCs), multi-level cells (MLLCs), triple-level cells (TLCs), quad-level cells (QLCs), penta-level cells (PLCs), and any suitable memory density that is greater than five bits per memory cell.

In some embodiments, the devices and methods of the present disclosure may refer to a storage device system (e.g., an SSD storage system), which includes a storage device such as a solid-state drive device, which is communicatively coupled to a host (e.g., a host device) by a network bus or interface.

An SSD is a data storage device that uses integrated circuit assemblies as memory to store data persistently. SSDs have no moving mechanical components, and this feature distinguishes SSDs from traditional electromechanical magnetic disks, such as hard disk drives (HDDs) or floppy disks, which contain spinning disks and movable read/write heads. Compared to electromechanical disks, SSDs are typically more resistant to physical shock, run silently, have lower access time, and less latency.

Many types of SSDs use NAND-based flash memory which retains data without power and includes a type of non-volatile storage technology. Quality of Service (QoS) of an SSD may be related to the predictability of low latency and consistency of high input/output operations per second (IOPS) while servicing read/write input/output (I/O) workloads. This means that the latency or the I/O command completion time needs to be within a specified range without having unexpected outliers. Throughput or I/O rate may also need to be tightly regulated without causing sudden drops in performance levels.

The subject matter of this disclosure may be better understood by reference to FIGS. 1-5.

Figure 1:
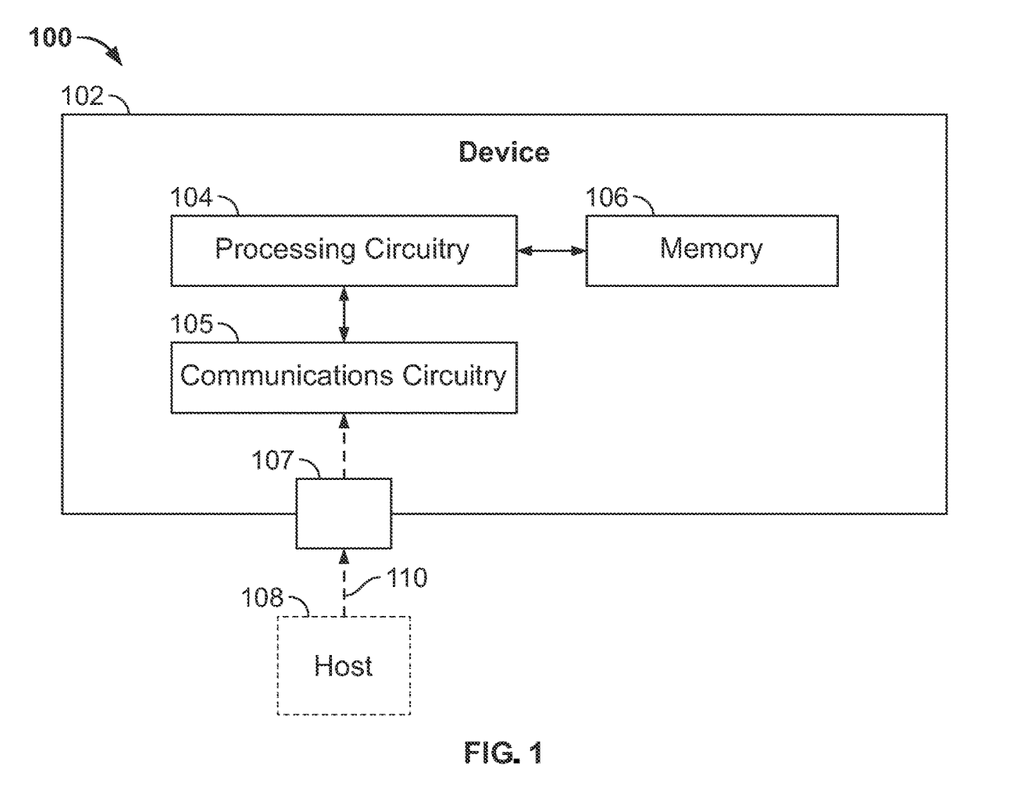
FIG. 1 shows an illustrative diagram of a system that includes a host and a device with processing circuitry and memory, in accordance with some embodiments of the present disclosure.

FIG. 1 shows an illustrative diagram of a system 100 that includes a host 108 and a device 102 with processing circuitry 104, communications circuitry 105, and memory 106, in accordance with some embodiments of the present disclosure. In some embodiments, device 102 may be a storage device such as a solid-state storage device (e.g., an SSD device). In some embodiments, processing circuitry 104 may include a processor or any suitable processing unit. In some embodiments, memory 106 may be non-volatile memory. It will be understood that the embodiments of the present disclosure are not limited to SSDs. For example, in some embodiments, device 102 may include a hard disk drive (HDD) device in addition to or in place of an SSD. In some embodiments, communications circuitry 105 includes temporary memory (e.g., cache or any suitable volatile memory) to store received write requests (e.g., write request 110) via port 107. Communications circuitry 105 is configured to receive write requests (e.g., write request 110) from host 108 and transmit data from device 102 to host 108. In some embodiments, each source memory band of a respective set of source memory bands stores data associated with the same host write stream from a respective host (e.g., host 108).

In some embodiments, processing circuitry 104 is configured to receive write requests (e.g., write request 110) from host 108, where each write request 110 includes host data. In some embodiments, the host data or the write requests (e.g., write request 110) are stored in memory 106. In some embodiments, write request 110 is transmitted on a network bus or interface to processing circuitry 104 via communications circuitry 105. In some embodiments, write request 110 is transmitted from an external source (e.g., a host 108 that is communicatively coupled to device 102 via port 107). The processing circuitry 104 may receive write requests (e.g., write request 110) from both internal and external sources of the device 102. In some embodiments, communications circuitry 105 includes volatile memory, which is configured to temporarily store any outstanding write requests (e.g., request 110) that are to be processed by processing circuitry 104. In some embodiments, the device may receive any one of NVMe write requests, Peripheral Component Interconnect Express (PCIe) write requests, and write requests of any other suitable interface protocol.

Additionally, device 102 includes memory 106. In some embodiments, memory 106 includes any one or more of a non-volatile memory, such as Phase Change Memory (PCM), a PCM and switch (PCMS), a Ferroelectric Random Access Memory (FeRAM), or a Ferroelectric Transistor Random Access Memory (FeTRAM), a Memristor, a Spin-Transfer Torque Random Access Memory (STT-RAM), and a Magnetoresistive Random Access Memory (MRAM), any other suitable memory, or any combination thereof. In some embodiments, memory 106 is of a memory density, the memory density is any one of (a) single-level cell (SLC) memory density, (b) multi-level cell (MLC) memory density, (c) tri-level cell (TLC) memory density, (d) quad-level cell (QLC) memory density, (e) penta-level cell (PLC) memory density, or (f) a memory density of greater than 5 bits per memory cell. In some embodiments, processing circuitry 104 is communicatively coupled to memory 106 to store and access data in memory blocks or pages. In some embodiments, a data bus interface is used to transport write/read instructions or data between processing circuitry 104 and memory 106.

In some embodiments, device 102 also includes volatile memory, which may include any one or more volatile memory, such as Static Random Access Memory (SRAM). In some embodiments, volatile memory is configured to temporarily store data (e.g., write request 110) during the execution of operations by processing circuitry 104. In some embodiments, each of processing circuitry 104 and communications circuitry 105 is communicatively coupled to volatile memory to store and access write request 110 data of the volatile memory. In some embodiments, a data bus interface is used to transport write request 110 data from volatile memory to processing circuitry 104. In some embodiments, volatile memory is communicatively coupled to memory 106, the volatile memory configured to function as a cache or temporary memory storage for memory 106. In some embodiments, a data bus interface between memory 106 and volatile memory provides a network bus for accessing or writing data to or from memory 106.

In some embodiments, the processor or processing unit of processing circuitry 104 may include a hardware processor, a software processor (e.g., a processor emulated using a virtual machine), or any combination thereof. The processor, also referred to herein as processing circuitry 104, may include any suitable software, hardware, or both for controlling memory 106 and processing circuitry 104. In some embodiments, device 102 may further include a multi-core processor. Memory 106 may also include hardware elements for non-transitory storage of instructions, commands, or requests.

Processing circuitry 104 is configured to perform defragmentation on multiple sets of source memory bands of device 102 using the merit score function while reducing recency bias when determining a source memory band to be garbage collected. Processing circuitry 104 determines a respective merit score corresponding to each source memory band of each set of source memory bands based on at least one characteristic of at least one respective portion of data of each corresponding source memory band. The characteristics that may be used by processing circuitry 104 to determine the merit score of each respective source memory band are (a) the amount of valid data in the respective source memory band and (b) the age of the valid data in the respective source memory band. Once processing circuitry 104 determines a respective merit score corresponding to each source memory band of each set of source memory bands, the processing circuitry may then determine a respective source memory band that corresponds to a second-highest merit score for each set of source memory bands. In some embodiments, when a respective set of source memory bands includes one source memory band, the sole source memory band may be considered to be the second-highest merit score for the respective set of source memory bands. Processing circuitry 104 then identifies a set of source memory bands from the plurality of sets of source memory bands that includes a source memory band corresponding to the highest second-highest merit score. Lastly, processing circuitry 104 stores at least one portion of valid data from at least one source memory band of the identified set of source memory bands to a defragmentation destination memory band. In some embodiments, the processing circuitry 104 performs defragmentation/garbage collection of the source memory bands of the identified set of source memory bands in descending order of merit score. The processing circuitry 104 first stores portions of valid data from a first source memory band that corresponds to the highest merit score to the defragmentation destination memory band. In some embodiments, as long as the defragmentation destination memory band has available memory to store further defragmented data or the identified set of source memory bands includes further portions of valid data to be defragmented, processing circuitry 104 continues to store portions of valid data from the source memory bands of the identified set of source memory bands to the defragmentation destination memory band. Processing circuitry 104 performs optimal garbage collection or defragmentation on a source memory band of an identified set of source memory bands based on the highest second-highest merit score, thereby reducing the impact of recency bias of performing garbage collection or defragmentation by using a merit score function. In some embodiments, once the defragmentation destination memory band is full, processing circuitry 104 closes the defragmentation destination memory band to any further defragmented valid data. In some embodiments, processing circuitry 104 then clears the completely defragmented source memory bands of the identified set of source memory bands in order for each of the cleared source memory bands to be reused to store new host data.

In some embodiments, device 102 may be a storage device (for example, SSD device) which may include one or more packages of memory dies (e.g., memory 106), where each die includes storage cells. In some embodiments, the storage cells of memory 106 are organized into sets of source memory bands, each set including at least one source memory band. Each set of source memory bands may include host data which originates from the same respective host (e.g., host 108) if multiple hosts are communicatively connected to device 102. In some embodiments, each source memory band of a respective set of source memory bands includes data from the same respective application or virtual machine operated on a host (e.g., host 108) when the host is operating on multiple applications or implemented virtual machines. In addition, memory 106 also includes blocks or pages of memory that are allocated as defragmentation destination memory bands, or bands of memory 106 configured to store defragmented portions of valid data of source memory bands. In some embodiments, the storage cells are organized into pages or super pages, such that pages and super pages are organized into blocks, each page or super page of a source memory band within a set of source memory bands. In some embodiments, each storage cell can store one or more bits of information.

For purposes of clarity and brevity, and not by way of limitation, the present disclosure is provided in the context of performing defragmentation on multiple sets of source memory bands of a device using a merit score function while reducing recency bias when determining a source memory band to be garbage collected. Processing circuitry 104 performs optimal garbage collection or defragmentation on a source memory band of an identified set of source memory bands based on the highest second-highest merit score, thereby reducing the impact of recency bias of performing garbage collection or defragmentation by using a merit score function. Processing circuitry 104 then stores valid data from at least one source memory band of the identified set of source memory bands to a defragmentation destination memory band. The process of performing defragmentation on multiple sets of source memory bands of a device may be configured by any suitable software, hardware, or both for implementing such features and functionalities. Performing defragmentation on multiple sets of source memory bands of a device, as disclosed, may be at least partially implemented in, for example, device 102 (e.g., as part of processing circuitry 104, or any other suitable device). For example, for a solid-state storage device (e.g., device 102), performing defragmentation on multiple sets of source memory bands of a device may be implemented in processing circuitry 104.

Figure 2:
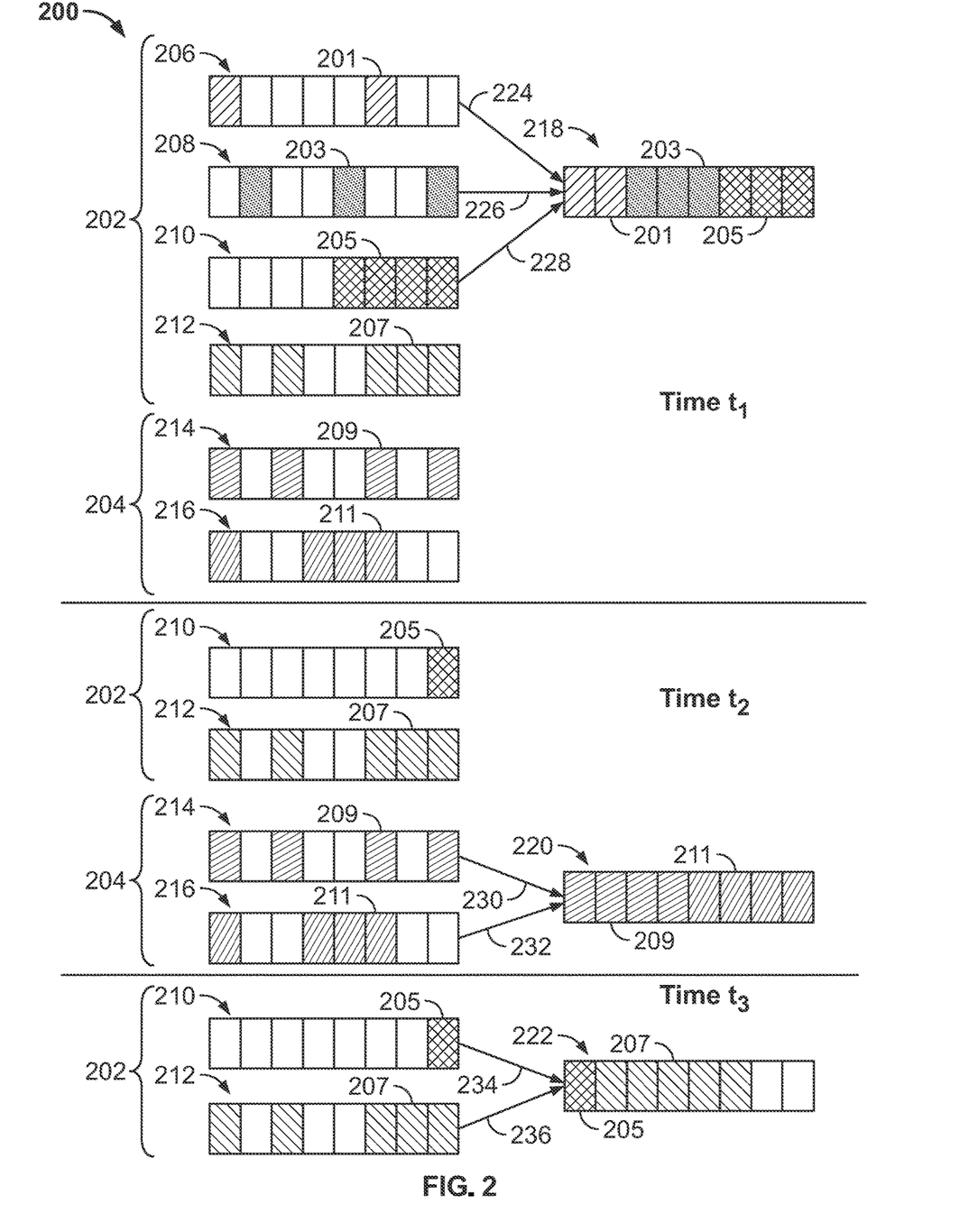
FIG. 2 shows an illustrative diagram that shows the defragmentation of sets of source memory bands to defragmentation destination memory bands, in accordance with some embodiments of the present disclosure.

FIG. 2 shows an illustrative temporal diagram 200 that shows defragmentation of sets of source memory bands (e.g., first set of source memory bands 202 and second set of source memory bands 204) to defragmentation destination memory bands (e.g., first defragmentation destination memory band 218, second defragmentation destination memory band 220, and third defragmentation destination memory band 222), in accordance with some embodiments of the present disclosure. As shown in FIG. 2, the first set of source memory bands 202 includes four source memory bands, including first source memory band 206, second source memory band 208, third source memory band 210, and fourth source memory band 212, and the second set of source memory bands 204 includes two source memory bands, including fifth source memory band 214 and sixth source memory band 216. Each source memory band (e.g., first source memory band 206, second source memory band 208, third source memory band 210, fourth source memory band 212, fifth source memory band 214, and sixth source memory band 216) of each set of source memory bands (e.g., first set of source memory bands 202 and second set of source memory bands 204) includes at least one portion of valid data. In the memory of FIG. 2, the first source memory band 206 includes two portions of valid data 201, the second source memory band 208 includes three portions of valid data 203, the third source memory band 210 includes four portions of valid data 205, and the fourth source memory band 212 includes five portions of valid data 207. Additionally, within the second set of source memory bands 204, the fifth source memory band 214 includes four portions of valid data 209 and the sixth source memory band 216 includes four portions of valid data 211. In some embodiments, for each respective source memory band, any portion of the respective source memory band that does not store valid data may store invalid or stale data, or may be empty. In some embodiments, the merit score of each respective source memory band is based on any one or more of (a) the amount of valid data in the respective source memory band and (b) the age of the valid data in the respective source memory band. For example, when the merit score function uses an amount of valid data in a respective source memory band to determine a corresponding merit score of the respective source memory band, the source memory bands (e.g., first source memory band 206, second source memory band 208, third source memory band 210, fourth source memory band 212, fifth source memory band 214, and sixth source memory band 216) shown in FIG. 2 may be ordered by merit score to prioritize certain source memory bands for the defragmentation/garbage collection process. For the purposes of the temporal diagram 200 shown, the merit score function used by processing circuitry 104 to determine a corresponding merit score of a respective source memory band is based on the amount of valid data stored in the respective source memory band.

At time $t_1$, the source memory bands may be ordered in descending merit score order: first source memory band 206, second source memory band 208, third source memory band 210, fifth source memory band 214, sixth source memory band 216, and fourth source memory band 212. In some embodiments, when two source memory bands have the same amount of valid data, the source memory band with the older data has a greater merit score. The processing circuitry 104 may then determine a respective source memory band that corresponds to a second-highest merit score for each set of source memory bands (e.g., first set of source memory bands 202 and second set of source memory bands 204). Based on the determined merit scores of each source memory band, the merit score of the second source memory band 208 is the second-highest merit score for the first set of source memory bands 202, and the merit score of the sixth source memory band 216 is the second-highest merit score for the second set of source memory bands 204. The processing circuitry 104 then identifies a set of source memory bands which includes the source memory band that corresponds to the highest second-highest merit score. At time $t_1$, the second source memory band 208 corresponds to the highest second-highest merit score, and therefore the processing circuitry 104 performs defragmentation/garbage collection on the first set of source memory bands 202. Once the processing circuitry 104 identifies the first set of source memory bands 202, processing circuitry 104 may then perform defragmentation/garbage collection of the source memory bands (e.g., first source memory band 206, second source memory band 208, third source memory band 210, and fourth source memory band 212) of the first set of source memory bands 202 in descending order of merit score.

In order to perform one of the defragmentation process and the garbage collection process, processing circuitry 104 stores respective portions of valid data (e.g., valid data 201, 203, 205, and 207) of the source memory bands (e.g., first source memory band 206, second source memory band 208, third source memory band 210, and fourth source memory band 212) of the first set of source memory bands 202 to a first defragmentation destination memory band 218. Based on the source memory bands ordered by merit score, the processing circuitry 104 first stores the two portions of valid data 201 from the first source memory band 206 to the first defragmentation destination memory band 218, by data transfer 224. As first defragmentation destination memory band 218 has available memory to store further defragmented data, processing circuitry 104 stores the three portions of valid data 203 from the second source memory band 208 to the first defragmentation destination memory band 218, by data transfer 226, and finally stores three of the four portions of valid data 205 from third source memory band 210 to the first defragmentation destination memory band 218, by data transfer 228. Once the first defragmentation destination memory band 218 is full, the processing circuitry 104 closes the first defragmentation destination memory band 218 to any further defragmented valid data. Processing circuitry 104 may then clear first source memory band 206 and second source memory band 208, in order for each of the cleared source memory bands to be reused to store new host data.

At time $t_2$, the source memory bands may be ordered in descending merit score order: third source memory band 210, fifth source memory band 214, sixth source memory band 216, and fourth source memory band 212. The processing circuitry 104 then determines that fourth source memory band 212 corresponds to the second-highest merit score in the first set of source memory bands 202, and that sixth source memory band 216 corresponds to the second-highest merit score in the second set of source memory bands 204. The processing circuitry 104 then identifies a set of source memory bands which includes the source memory band that corresponds to the highest second-highest merit score. At time $t_2$, sixth source memory band 216 corresponds to the highest second-highest merit score, and therefore the processing circuitry 104 performs defragmentation/garbage collection on the second set of source memory bands 204. Once the processing circuitry 104 identifies the second set of source memory bands 204, processing circuitry 104 may then perform defragmentation/garbage collection of the source memory bands (e.g., fifth source memory band 214 and sixth source memory band 216) of the second set of source memory bands 204 in descending order of merit score.

During the defragmentation/garbage collection process of second set of source memory bands 204, processing circuitry 104 stores respective portions of valid data (e.g., valid data 209 and 211) of the source memory bands (e.g., fifth source memory band 214 and sixth source memory band 216) of the second set of source memory bands 204 to a second defragmentation destination memory band 220. Based on the source memory bands ordered by merit score, the processing circuitry 104 first stores the four portions of valid data 209 from the fifth source memory band 214 to second defragmentation destination memory band 220, by data transfer 230. As second defragmentation destination memory band 220 has available memory to store further defragmented data, processing circuitry 104 then stores the four portions of valid data 211 from sixth source memory band 216 to second defragmentation destination memory band 220, by data transfer 232. Once the second defragmentation destination memory band 220 is full, the processing circuitry 104 closes the second defragmentation destination memory band 220 to any further defragmented valid data. In some embodiments, processing circuitry 104 is configured to clear the data of fifth source memory band 214 and sixth source memory band 216, in order for each of the cleared source memory bands to be reused to store new host data. By using the highest second-highest merit score as a basis for identifying a set of source memory bands, the processing circuitry 104 performs garbage collection more efficiently and optimally. This reduces the impacts on performance and endurance by the recency bias of garbage collection/defragmentation processes which use merit score functions.

At time $t_3$, the source memory bands may be ordered in descending merit score order: third source memory band 210 and fourth source memory band 212. In some embodiments, the processing circuitry 104 identifies that the first set of source memory bands 202 is the only remaining set of source memory bands to be defragmented. In some embodiments, the processing circuitry 104 determines that fourth source memory band 212 corresponds to the second-highest merit score in the first set of source memory bands 202, and then identifies that the first set of source memory bands 202 includes the source memory band that corresponds to the highest second-highest merit score (e.g., fourth source memory band 212). Therefore the processing circuitry 104 performs defragmentation/garbage collection on the source memory bands (e.g., third source memory band 210 and fourth source memory band 212) of the first set of source memory bands 202 in descending order of merit score. During the defragmentation/garbage collection process of first set of source memory bands 202, processing circuitry 104 stores respective portions of valid data (e.g., valid data 205 and 207) of the source memory bands (e.g., third source memory band 210 and fourth source memory band 212) of the first set of source memory bands 202 to a third defragmentation destination memory band 222. Based on the source memory bands ordered by merit score, the processing circuitry 104 first stores the single remaining portion of valid data 205 from the third source memory band 210 to third defragmentation destination memory band 222, by data transfer 234. As third defragmentation destination memory band 222 has available memory to store further defragmented data, processing circuitry 104 then stores the five portions of valid data 207 from fourth source memory band 212 to third defragmentation destination memory band 222, by data transfer 236. Once each portion of valid data (e.g., portions of valid data 205 and 211) from third source memory band 210 and fourth source memory band 212 has been stored in third defragmentation destination memory band 222, the processing circuitry 104 closes the third defragmentation destination memory band 222 to any further defragmented valid data. In some embodiments, processing circuitry 104 is configured to clear the data of third source memory band 210 and fourth source memory band 212, in order for each of the cleared source memory bands to be reused to store new host data.

Figure 3:
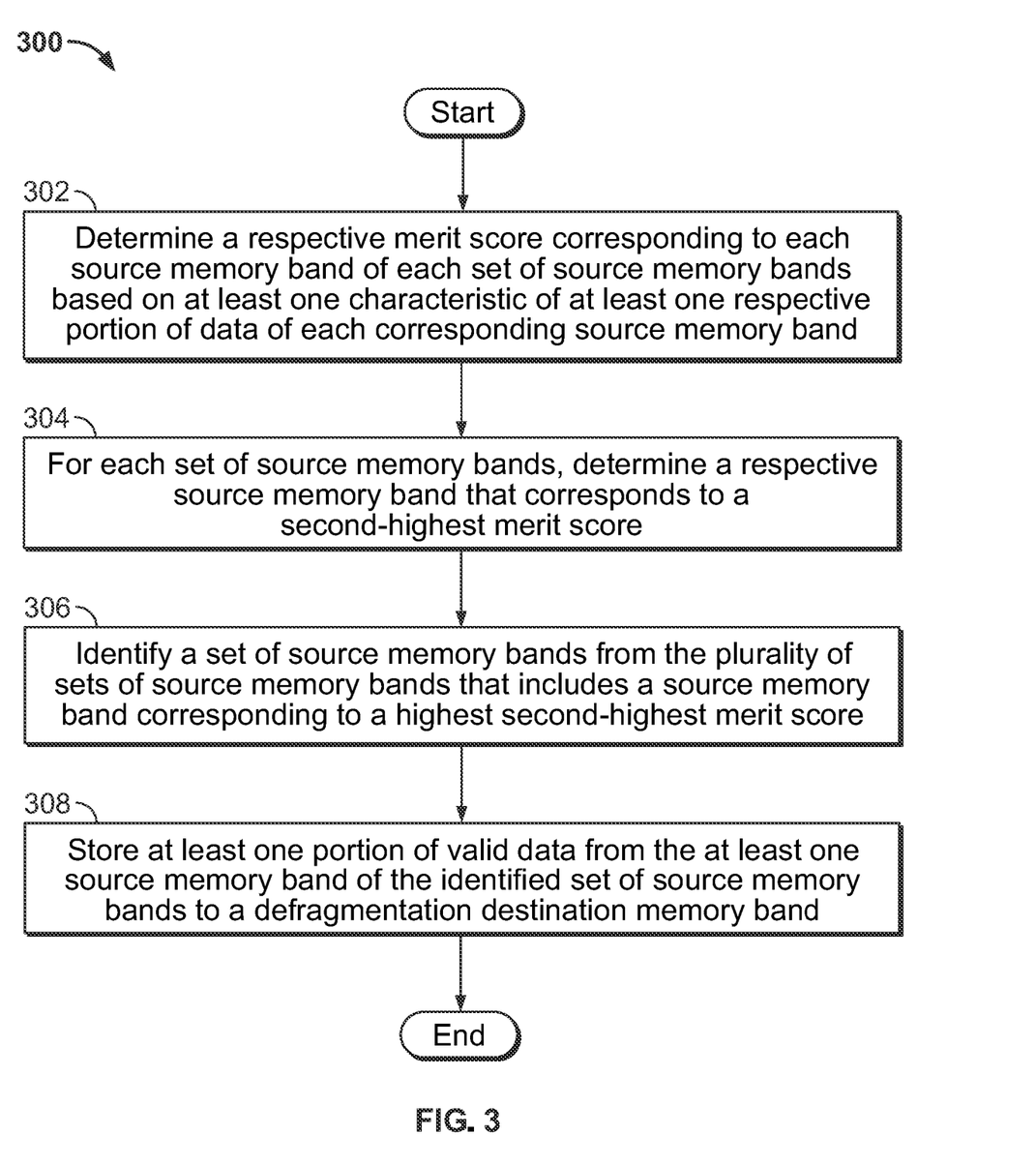
FIG. 3 shows a flowchart of illustrative steps for performing defragmentation on multiple sets of source memory bands of a device, in accordance with some embodiments of the present disclosure.

FIG. 3 shows a flowchart of illustrative steps of process 300 for performing defragmentation on multiple sets of source memory bands of a device, in accordance with some embodiments of the present disclosure. In some embodiments, the referenced system, device, processing circuitry, communications circuitry, memory, port, host, and write request may be implemented as system 100, device 102, processing circuitry 104, communications circuitry 105, memory 106, port 107, host 108, and write request 110, respectively. In some embodiments, the process 300 can be modified by, for example, having steps rearranged, changed, added, and/or removed.

At step 302, processing circuitry determines a respective merit score corresponding to each source memory band of each set of source memory bands based on at least one characteristic of at least one respective portion of data of each corresponding source memory band. The characteristics that may be used by processing circuitry to determine the merit score of each respective source memory band are (a) the amount of valid data in the respective source memory band and (b) the age of the valid data in the respective source memory band. For example, when two source memory bands have the same amount of valid data, the source memory band with the older data may correspond to a greater merit score. Once the processing circuitry determines a respective merit score corresponding to each source memory band of each set of source memory bands, the processing circuitry may then determine a respective source memory band that corresponds to a second-highest merit score for each set of source memory bands, at step 304.

At step 304, processing circuitry determines a respective source memory band that corresponds to a second-highest merit score for each set of source memory bands. In some embodiments, when a respective set of source memory bands includes one source memory band, the sole source memory band may be considered to be the second-highest merit score for the respective set of source memory bands. Once the processing circuitry determines a respective source memory band that corresponds to a second-highest merit score for each set of source memory bands, the processing circuitry then identifies a set of source memory bands which includes the source memory band that corresponds to the highest second-highest merit score, at step 306.

At step 306, processing circuitry identifies a set of source memory bands from the plurality of sets of source memory bands that includes a source memory band corresponding to the highest second-highest merit score. In some embodiments where the processing circuitry has partially performed garbage collection on a source memory band, this step aids in reducing the recency bias of merit function-based decisions to improve the fairness of performing garbage collection of the source memory bands of the identified set of source memory bands. The processing circuitry then performs defragmentation/garbage collection on the set of source memory bands that includes the source memory band that corresponds to the highest second-highest merit score, at step 308.

At step 308, processing circuitry stores at least one portion of valid data from at least one source memory band of the identified set of source memory bands to a defragmentation destination memory band. In some embodiments, the processing circuitry performs defragmentation/garbage collection of the source memory bands of the identified set of source memory bands in descending order of merit score. The processing circuitry first stores portions of valid data from a first source memory band that corresponds to the highest merit score to the defragmentation destination memory band. In some embodiments, as long as the defragmentation destination memory band has available memory to store further defragmented data or the identified set of source memory bands includes further portions of valid data to be defragmented, processing circuitry continues to store portions of valid data from the source memory bands of the identified set of source memory bands to the defragmentation destination memory band. Processing circuitry performs optimal garbage collection or defragmentation on a source memory band of an identified set of source memory bands based on the highest second-highest merit score, thereby reducing the impact of recency bias of performing garbage collection or defragmentation by using a merit score function. In some embodiments, once the defragmentation destination memory band is full, the processing circuitry closes the defragmentation destination memory band to any further defragmented valid data. In some embodiments, processing circuitry then clears the completely defragmented source memory bands of the identified set of source memory bands in order for each of the cleared source memory bands to be reused to store new host data.

Figure 4:
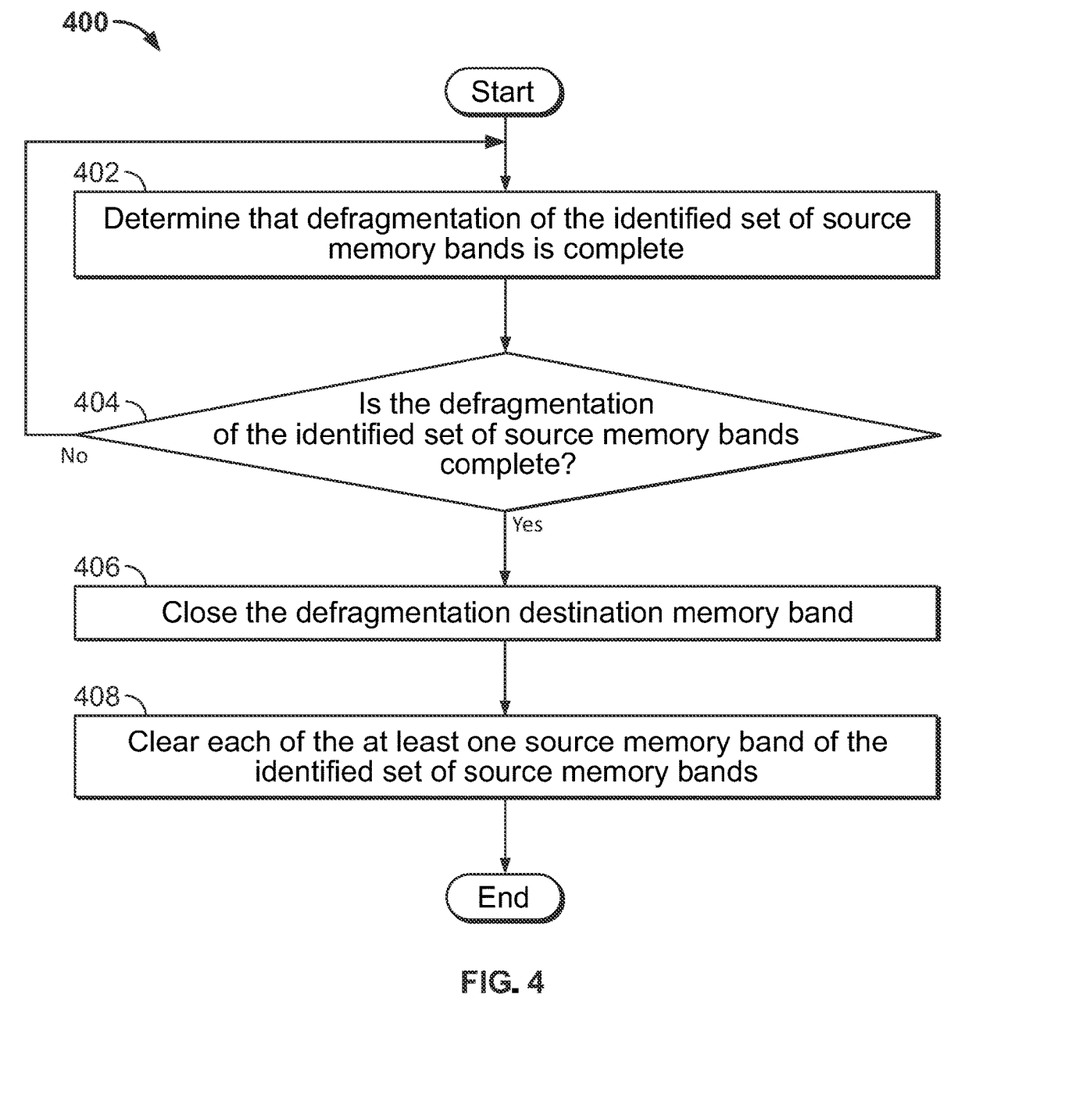
FIG. 4 shows a flowchart of illustrative steps of a sub-process for performing garbage collection of invalid data of a respective set of source memory bands, in accordance with some embodiments of the present disclosure.

FIG. 4 shows a flowchart of illustrative steps of a sub-process 400 for performing garbage collection of invalid data of a respective set of source memory bands, in accordance with some embodiments of the present disclosure. In some embodiments, the referenced system, device, processing circuitry, communications circuitry, memory, port, host, and write request may be implemented as system 100, device 102, processing circuitry 104, communications circuitry 105, memory 106, port 107, host 108, and write request 110, respectively. In some embodiments, the sub-process 400 can be modified by, for example, having steps rearranged, changed, added, and/or removed.

At step 402, processing circuitry determines that defragmentation of the identified set of source memory bands is complete. In some embodiments, the defragmentation of the identified set of source memory bands is complete when the defragmentation destination memory band is full and can no longer store any further valid data from the identified set of source memory bands. The processing circuitry may determine that the defragmentation destination memory band is full based on an interrupt signal sent from the memory indicating a full defragmentation destination memory band. In other embodiments, the defragmentation of the identified set of source memory bands is complete when defragmentation has been performed on each source memory band of the identified set of source memory bands. As valid data of the identified set of source memory bands are being stored in the defragmentation destination memory band, the processing circuitry may mark each portion of valid data which has already been stored in the defragmentation destination memory band. This mark may be implemented as an invalid bit or flag indicating that the portion of data may be cleared or overwritten by new data (e.g., host data).

At step 404, the processing circuitry continues to another step depending on the determination of whether the defragmentation of the identified set of source memory bands is complete, at step 402. When the processing circuitry determines that defragmentation of the identified set of source memory bands is not complete, the processing circuitry continues to perform defragmentation of the identified set of source memory bands and continues to determine whether the defragmentation of the identified set of source memory bands is complete, at 402. If the processing circuitry determines that the defragmentation of the identified set of source memory bands is complete, the processing circuitry closes the defragmentation destination memory band, at step 406.

At step 406, the processing circuitry closes the defragmentation destination memory band. Once the defragmentation of the identified set of source memory bands is complete, the corresponding defragmentation destination memory band is closed and can no longer store any further valid data from the identified set of source memory bands. Once the defragmentation destination memory band is closed, the processing circuitry then clears at least one source memory band of the identified set of source memory bands, at step 408.

At step 408, the processing circuitry clears each of at least one source memory band of the identified set of source memory bands. In some embodiments, the data cleared by processing circuitry is invalid or stale data. Once the processing circuitry clears each of the source memory bands of the identified set of source memory bands, the source memory bands of the identified set of source memory bands may be reused to store further host data or write stream data. In some embodiments, not every source memory band of the identified set of source memory bands is cleared by processing circuitry, but rather each source memory band on which defragmentation has been performed is cleared by processing circuitry. Therefore, if a set of source memory bands has been partially defragmented with at least one respective source memory band which data that has yet to be stored in the corresponding defragmentation destination memory band, the processing circuitry may clear all defragmented source memory bands except at least one respective source memory band. Once the defragmented source memory bands of the identified set of source memory bands are cleared, the processing circuitry identifies a set of source memory bands onto which processing circuitry performs defragmentation/garbage collection based on the second-highest merit scores of a respective source memory band for each set of source memory bands. In addition, the processing circuitry allocates another defragmentation destination memory band at which to store portions of valid data of the next identified set of source memory bands.

Figure 5:
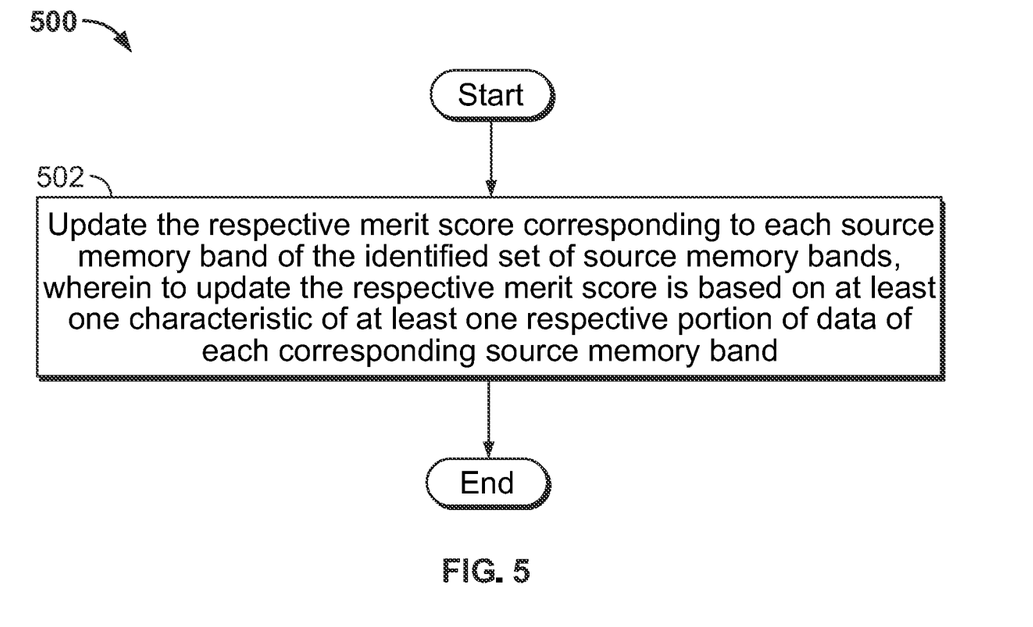
FIG. 5 shows a flowchart of illustrative steps of a sub-process for updating merit scores of source memory bands, in accordance with some embodiments of the present disclosure.

FIG. 5 shows a flowchart of illustrative steps of a subprocess 500 for updating merit scores of source memory bands, in accordance with some embodiments of the present disclosure. In some embodiments, the referenced system, device, processing circuitry, communications circuitry, memory, port, host, and write request may be implemented as system 100, device 102, processing circuitry 104, communications circuitry 105, memory 106, port 107, host 108, and write request 110, respectively. In some embodiments, the subprocess 500 can be modified by, for example, having steps rearranged, changed, added, and/or removed.

At step 502, processing circuitry updates the respective merit score corresponding to each source memory band of the identified set of source memory bands, updating the respective merit score is based on at least one characteristic of at least one respective portion of data of each corresponding source memory band. In some embodiments, when a respective source memory band of an identified set of source memory bands is partially defragmented by the processing circuitry, the merit score of the respective source memory is updated to reflect the change in at least one characteristic of the respective portions of data in the respective, partially defragmented source memory band. The processing circuitry is to use the same merit score function when updating the merit score corresponding to a source memory band as when determining the merit scores of each source memory band for each set of source memory bands. In some embodiments, the updated merit score for a respective source memory band is based on at least one of (a) an amount of valid data in the respective source memory band and (b) the age of data in the respective source memory band.

The terms "an embodiment", "embodiment", "embodiments", "the embodiment", "the embodiments", "one or more embodiments", "some embodiments", and "one embodiment" mean "one or more (but not all) embodiments" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments. Further, although process steps, method steps, algorithms or the like may be described in a sequential order, such processes, methods, and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

At least certain operations that may have been illustrated in the figures show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to be limited to the precise forms disclosed. Many modifications and variations are possible in light of the above teaching.

What is claimed is:

1. A method for performing defragmentation on a plurality of sets of source memory bands of a device, each set of source memory bands comprising at least one source memory band storing data of a respective data type and wherein each of the at least one source memory band comprises at least one portion of valid data, the method comprising:
    determining, by processing circuitry of the device, a respective merit score corresponding to each source memory band of each set of source memory bands based on at least one characteristic of at least one respective portion of data of each corresponding source memory band;
    for each set of source memory bands, determining, by the processing circuitry, a respective source memory band that corresponds to a second-highest merit score;
    identifying, by the processing circuitry, a set of source memory bands from the plurality of sets of source memory bands that comprises a source memory band corresponding to a highest second-highest merit score; and
    storing, by the processing circuitry, at least one portion of valid data from the at least one source memory band of the identified set of source memory bands to a defragmentation destination memory band.

2. The method according to claim 1, the method further comprising:
    determining that defragmentation of the identified set of source memory bands is complete; and in response to the determining that the defragmentation of the identified set of source memory bands is complete:
  closing the defragmentation destination memory band; and
  clearing each of the at least one source memory band of the identified set of source memory bands.

3. The method according to claim 2, wherein determining that the defragmentation of the identified set of source memory bands is complete comprises determining that the defragmentation destination memory band is full of stored valid data.

4. The method according to claim 2, wherein determining that the defragmentation of the identified set of source memory bands is complete comprises determining that each portion of valid data of the at least one source memory band of the identified set of source memory bands is stored at the defragmentation destination memory band.

5. The method according to claim 1, the method further comprising:
  updating the respective merit score corresponding to each source memory band of the identified set of source memory bands, wherein updating the respective merit score is based on at least one characteristic of at least one respective portion of data of each corresponding source memory band.

6. The method according to claim 1, the method further comprising:
  initializing the defragmentation destination memory band, wherein the defragmentation destination memory band is configured to store data of the respective data type corresponding to the identified set of source memory bands.

7. The method according to claim 1, wherein the at least one characteristic of at least one respective portion of data of each corresponding source memory band comprises at least one of (a) a value that is indicative of an amount of valid data in a corresponding source memory band and (b) a value that is indicative of an age of data in a corresponding source memory band.

8. A device comprising:
  memory comprising:
    a plurality of sets of source memory bands, each set of source memory bands comprising at least one source memory band to store data of a respective data type and wherein each of the at least one source memory band comprises at least one portion of valid data; and
    a defragmentation destination memory band; and
  processing circuitry communicatively coupled to the memory, the processing circuitry to:
    determine a respective merit score corresponding to each source memory band of each set of source memory bands based on at least one characteristic of at least one respective portion of data of each corresponding source memory band;
    determine, for each set of source memory bands, a respective source memory band that corresponds to a second-highest merit score;
    identify a set of source memory bands from the plurality of sets of source memory bands that comprises a source memory band corresponding to a highest second-highest merit score; and
    store at least one portion of valid data from the at least one source memory band of the identified set of source memory bands to the defragmentation destination memory band.

9. The device of claim 8, wherein the processing circuitry is further to:
  determine that defragmentation of the identified set of source memory bands is complete; and
  in response to the determination that the defragmentation of the identified set of source memory bands is complete:
    close the defragmentation destination memory band; and
    clear each of the at least one source memory band of the identified set of source memory bands.

10. The device of claim 9, wherein to determine that the defragmentation of the identified set of source memory bands is complete the processing circuitry is to determine that the defragmentation destination memory band is full of stored valid data.

11. The device of claim 9, wherein to determine that the defragmentation of the identified set of source memory bands is complete the processing circuitry is to determine that each portion of valid data of the at least one source memory band of the identified set of source memory bands is stored at the defragmentation destination memory band.

12. The device of claim 8, wherein the processing circuitry is further to:
  update the respective merit score corresponding to each source memory band of the identified set of source memory bands, wherein to update the respective merit score is based on at least one characteristic of at least one respective portion of data of each corresponding source memory band.

13. The device of claim 8, wherein the processing circuitry is further to:
  initialize the defragmentation destination memory band, wherein the defragmentation destination memory band is configured to store data of the respective data type corresponding to the identified set of source memory bands.

14. The device of claim 8, wherein the at least one characteristic of at least one respective portion of data of each corresponding source memory band comprises at least one of (a) a value that is indicative of an amount of valid data in a corresponding source memory band and (b) a value that is indicative of an age of the data in a corresponding source memory band.

15. The device of claim 8, wherein the data stored in the at least one source memory band of a respective set of source memory bands corresponds to data from a respective host of a plurality of hosts.

16. The device of claim 8, wherein the data stored in the at least one source memory band of a respective set of source memory bands corresponds to data from a respective tenant of a plurality of tenants of a host.

17. The device of claim 8, wherein the data stored in the at least one source memory band of a respective set of source memory bands corresponds to data from a respective application of a plurality of applications performing on a host.

18. A non-transitory computer-readable medium having instructions encoded thereon that, when executed by processing circuitry, cause to be performed a method for defragmentation on a plurality of sets of source memory bands, each set of source memory bands comprising at least one source memory band storing data of a respective data type and wherein each of the at least one source memory band comprises at least one portion of valid data, the method comprising:
  determining a respective merit score corresponding to each source memory band of each set of source memory bands based on at least one characteristic of at least one respective portion of data of each corresponding source memory band;

for each set of source memory bands, determining a respective source memory band that corresponds to a second-highest merit score;

identifying a set of source memory bands from the plurality of sets of source memory bands that comprises a source memory band corresponding to a highest second-highest merit score; and storing at least one portion of valid data from the at least one source memory band of the identified set of source memory bands to a defragmentation destination memory band.

19. The non-transitory computer-readable medium of claim 18, the method further comprising:

determining that defragmentation of the identified set of source memory bands is complete; and in response to the determining that the defragmentation of the identified set of source memory bands is complete:
  closing the defragmentation destination memory band; and
  clearing each of the at least one source memory band of the identified set of source memory bands.

20. The non-transitory computer-readable medium of claim 19, wherein determining that the defragmentation of the identified set of source memory bands is complete comprises determining that the defragmentation destination memory band is full of stored valid data.

\* \* \* \* \*